May 9, 1933.  W. W. HARTMAN  1,908,239
PROCESS OF DEHYDRATING AQUEOUS ACETIC ACID
Filed March 20, 1931  2 Sheets-Sheet 2
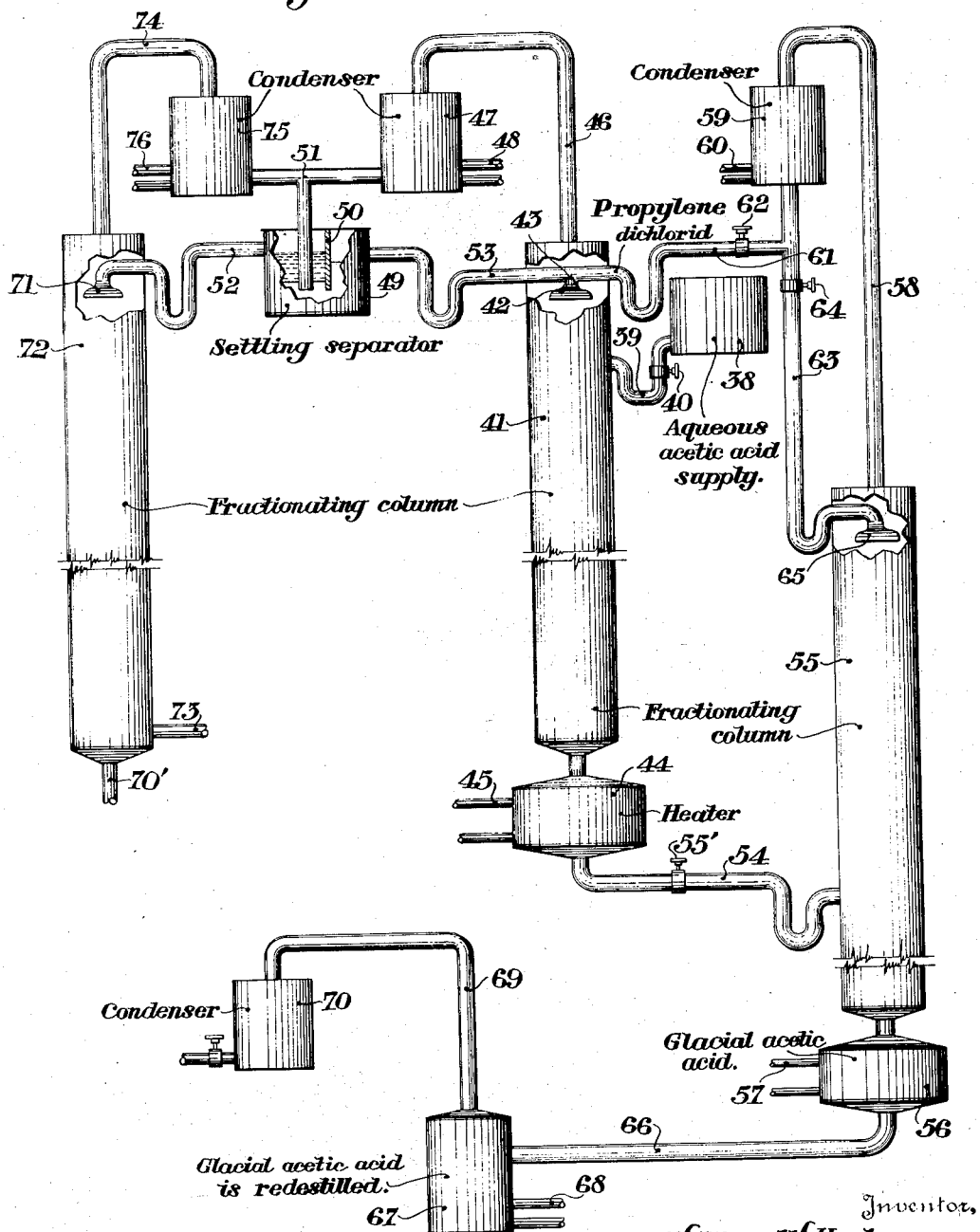

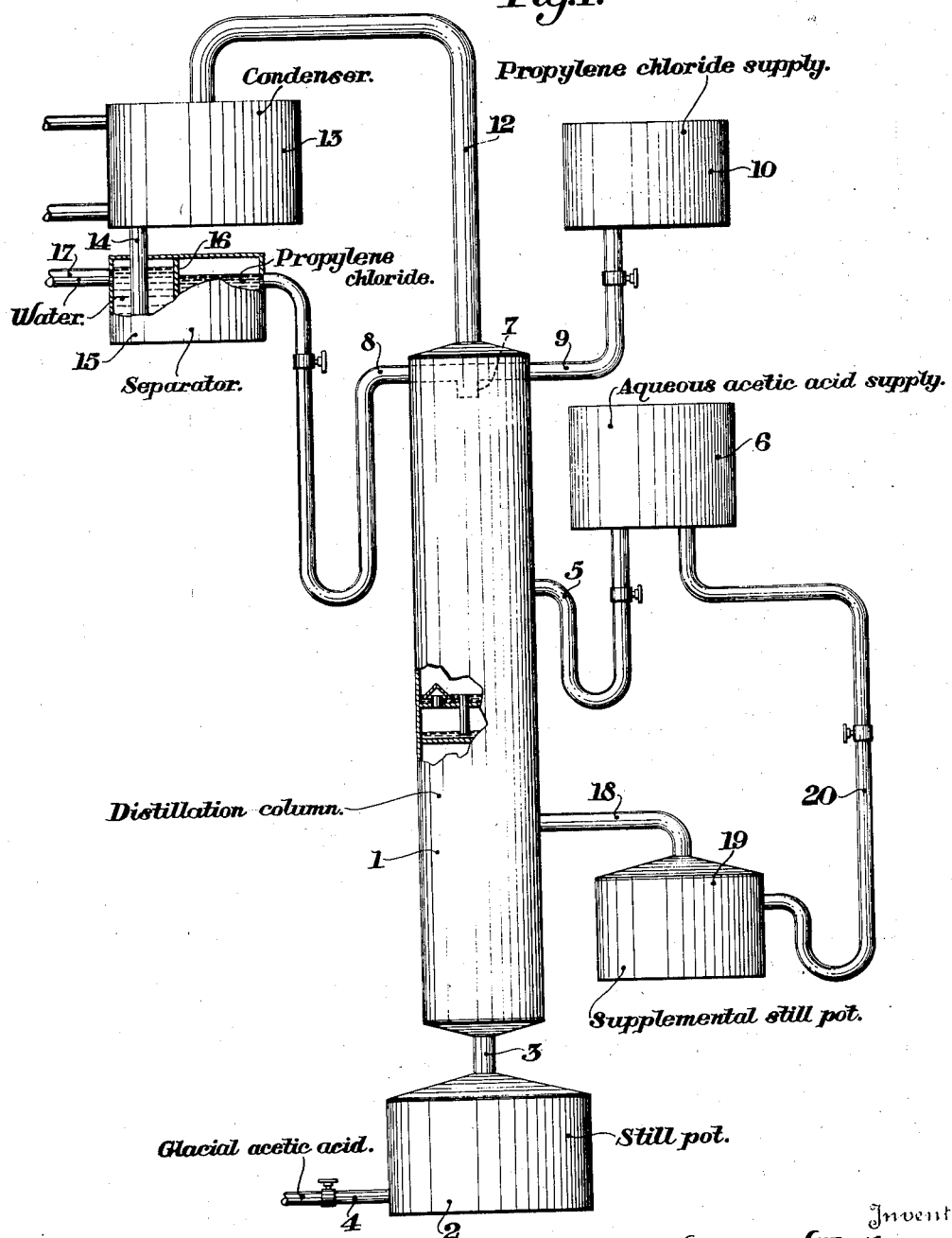

UNITED STATES PATENT OFFICE

WILLIAM W. HARTMAN, OF ROCHESTER, NEW YORK, ASSIGNOR TO EASTMAN KODAK COMPANY, OF ROCHESTER, NEW YORK, A CORPORATION OF NEW YORK

PROCESS OF DEHYDRATING AQUEOUS ACETIC ACID

Application filed March 20, 1931. Serial No. 524,063.

This invention relates to processes of removing water from aqueous acetic acid. One object of the invention is to provide a process that will be simple, inexpensive, and yet applicable to solutions of any strength, high or low. Another object is to provide a process which will be applicable not only to relatively pure water solutions of acetic acid, but also to the production of concentrated and glacial acetic acid from crude aqueous acetic acid, such as the pyroligneous liquor from wood distillation. A further object is to provide a process in which the water which is finally removed carries away only a very small or negligible amount of acetic acid with it. Still another object is to provide such a process in which the amount of heat required is kept as low as possible. A further object is to provide such a process in which distillation is the main factor without the trouble and cost of initial extraction steps. Another object is to provide a process in which distillation of the aqueous acid is carried out with the aid of an auxiliary organic liquid which combines the essential properties of such an auxiliary in a way not heretofore known. Other objects will hereinafter appear.

The removal of water wholly or partially from aqueous acetic acid is a problem of great technical importance. For example, certain chemical processes, such as the manufacture of cellulose acetate, use large quantities of glacial or anhydrous acetic acid, and often have left at the end of such manufacture large amounts of dilute acetic acid from which the water must be removed before it can be reemployed. To lessen the expense of such removal is highly desirable. Also acetic acid in the first stages of its production is too diluted with water for most manufacturing processes. For example, the largest present source of acetic acid is the destructive distillation of wood, which produces initially a dilute aqueous solution of acetic acid with other bodies called pyroligneous liquor. It is highly desirable to remove the water from this liquor (after separating out most of said other bodies) by a process which is simple and more inexpensive than those heretofore used. When acetic acid is made by action of micro-organisms, it is formed in dilute aqueous solutions which it is desirable to concentrate cheaply.

My process of removing water is primarily a distillation one, in contradistinction to a solvent extraction process. I have found that the hereinabove mentioned objects and desired results may be attained by mixing the aqueous acetic acid with propylene chloride and distilling water and propylene chloride from the mixture at a temperature below the boiling point of glacial acetic acid and even below the boiling point of water. Preferably extraction agents, especially high-boiling ones, are not present, because they are expensive, troublesome to recover and require too much heat. The process is preferably carried out in a fractionating column of known type, the distilled water and propylene chloride being condensed, allowed to settle into two layers, and the propylene chloride which forms the lower layer being returned to the upper part of the column. In the preferred embodiment of my process the propylene chloride passes through a cycle without serious loss and can be used over and over. The bulk of it separates from the water by gravity in the distillate and this layer is reconducted to the still.

Propylene chloride is a colorless liquid having the formula:

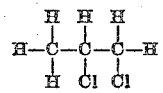

It is a saturated compound and may be regarded as dichlor-propane. It has a boiling point of 96.8° C. and is practically immiscible with water, the water dissolving only about .27 of one percent of it at 20° C. It forms with water an azeotropic mixture which boils at about 77.5° C. and which mixture consists of about 88% propylene chloride and 12% water or a ratio of about 7⅓ to 1. In other words during distillation thereof, every seven parts of propylene chloride which is distilled will carry over approximately one part of water. As the acetic acid does not enter into the azeotropic mixture which is formed, the acetic acid is left behind in the column or other distillation vessel and thereby dehydrated. And if a distillation column be employed as the dehydrating apparatus, the acetic acid gradually becomes more concentrated as it descends the column (it having the highest boiling point), the water and propylene chloride are driven off from the acetic acid as it descends the column and the propylene chloride as it passes up the column in successive stages carries with it more and more water until from the top plate of the column there is distilled off the azeotropic mixture above referred to. It is to be noted that any unit of propylene chloride will carry away with it, as an azeotropic mixture, more water than an equal unit of any of the withdrawing agents previously suggested in the art for use in dehydrating aqueous acetic acid. Propylene chloride, therefore, fulfills the many requirements for a good withdrawing agent unusually well. It will be obvious that in as much as dehydration is the object of the process, at least a slight excess of propylene chloride over that required to form an azeotrope with water present at that point should be kept at all points in the system at which distillation takes place or at least at the point where the last vaporization of the azeotrope takes place.

When using a proper fractionating column there is substantially no acid (less than 0.5%) in the watery layer of the distillate. Since distillation will not concentrate aqueous acid weaker than the watery layer of the distillate and since my process in proper apparatus causes virtually no acid in such layer, the process will concentrate aqueous acetic acid of any strength,—from less than 1% to over 99%. A propylene chloride layer in contact with a watery layer, in the distillate will take up a high proportion of the acetic acid present. Thus the distribution ratio of acid between water and the liquid is low.

In the accompanying drawings in which like reference characters refer to like parts, Fig. 1 is a semi-diagrammatic side elevation of one form of apparatus in which my process may be carried out, certain of the parts being exaggerated and portions of others broken away for clarity, and Fig. 2 is similar view of another form of apparatus which may be used to carry out my invention.

In Fig. 1, the numeral 1 represents a distillation column of well-known construction such as a column provided with a series of plates with bubble cap construction so that the vapors rising in the column are caused to pass through the liquid which is collected upon each plate. A portion of the column is broken away to show in diagrammatic form the construction of the plates. For carrying out my process, a column still of approximately 40-plate construction is found to be suitable. At the bottom of the column is provided a still pot 2 of the usual construction such as that heated by steam pipes or other well-known means. This still pot is connected with the column by a pipe 3 for the purpose of conducting vapors arising from the still pot into the column 1. A suitable draw-off pipe 4 equipped with a valve is provided for the still pot 2 by means of which substantially pure glacial acetic acid may be withdrawn from the still pot as hereinafter further discussed.

At a point approximately two-thirds of the way up the column, or in other words, at approximately plate 25, is provided a valved inlet pipe 5 for the introduction into the column of aqueous acetic acid from the acid supply tank 6, mounted preferably above the inlet pipe in order that the acid will flow into the column by means of gravity. In the top portion of the column 1 and at a point above the uppermost plate in the column is provided a propylene chloride inlet 7. Two valved propylene chloride supply pipes, 8 and 9, connected with the inlet 7 are provided for the introduction of propylene chloride into the top of the column. The supply pipe 9 is connected with a propylene chloride supply tank 10 for a purpose hereinafter to be discussed. The function of the supply line 8 will also be further related.

At the head of the column 1 is provided a vapor outlet or pipe 12 which is connected with the condenser 13 which may be cooled by any suitable medium such as water entering and leaving by the pipes shown. Any condensate accumulating in the condenser 13 is conducted by means of a pipe 14 into the separator 15 which separator is provided with a baffle plate 16 extending to within a short distance of the bottom of the separator. The pipe 17 carries away water which separates out in the separator and the pipe 8 conducts propylene chloride which separates out in the separator back to the head of the column for re-use therein. At a point approximately one-third of the way up the column 1, or approximately opposite plate number 14 of the column, is provided a vapor inlet 18 which connects the supplemental still pot 19 with the column 1. A valved pipe line 20 is provided to conduct aqueous acetic acid from the acid supply tank 6 to the supplemental still pot 19. The still pot 19 may be of similar construction to the still pot 2 and may also be provided with an outlet for withdrawing from the still pot 19 such residual impurities as may collect therein. It will be obvious that the construction above described is merely diagrammatic and that the elements described are all well known to those skilled in this art and may be of such suitable construction as would be employed by any distillation engineer.

Assuming the plant to be newly constructed it is necessary, of course, in order to place it in operation that the still pot 2 be charged, for instance, with glacial acetic acid and that a supply of aqueous acetic acid and propylene chloride be at hand and be contained in the tanks 6 and 10 respectively. Through the pipe 5, aqueous acetic acid is introduced slowly into the column 1 and heat applied to the still pot 2. It may be stated at this point that aqueous acetic acid analyzing anywhere from 1 or 2% to 98% or more of acetic acid may be profitably and successfully concentrated by my process to as strong as 99.8% or more purity. At the same time a supply of propylene chloride is introduced into the column 1 through the pipe 9. Upon starting the process, therefore, the plates of the lower two-thirds of the column will contain aqueous acetic acid and the plates of the upper third of the column will contain propylene chloride. This condition exists, however, only at the start of the process as the process soon comes to equilibrium and operates in a continuous manner.

Assuming therefore that the process is in continuous operation, it operates in the following manner: Upon at least the top plate of the column there exists a constant boiling mixture of propylene chloride and water, it being necessary only to maintain upon the upper plate of the column a slight excess of propylene chloride. This constant boiling mixture of propylene chloride and water vaporizes due to the heat supplied to the column from the still pot 2 and the azeotropic vapor mixture of water and propylene chloride passes over through the pipe 12 into the condenser 13 wherein the vapor condenses into a liquid mixture of propylene chloride and water which passes through the pipe 14 into the separator 15.

In this separator the propylene chloride, being the heavier of the two liquids, settles to the bottom and passes under the baffle 16 into the right-hand section of the separator, is continuously drawn off therefrom by means of the pipe 17 leading to the sewer. The pipe 8 controlled by a valve returns the propylene chloride to the head of the column where by means of the inlet 7 it is reintroduced into the system. The process being in continuous operation, it is necessary to introduce very little propylene chloride from the supply tank 10 inasmuch as it is used only to supply the small amount of propylene chloride which may be lost in the system, such as through slight leakage or through being carried off by slight occlusion or solution in the water drawn off from the separator by the pipe 17. Assuming that the process is being operated without the assistance of the supplemental still pot 19, aqueous acetic acid is continuously introduced through the pipe 5 at a rate equivalent to the capacity of the column still 1 for dehydrating the aqueous acetic acid. From the point where the aqueous acetic acid is introduced into the column, if we proceed downward, plate by plate, it will be found that the percentage of water in the aqueous acetic acid decreases. If we proceed upward from the point at which the pipe 5 enters the column still, we will find that the percentage of acetic acid contained in the mixture upon each plate will decrease until on the top plate substantially no acetic acid exists in the mixture. Also as we proceed upwardly in the upper plates of the column we will find that the percentage of water in the propylene chloride mixture increases.

The converse of this is that as we proceed downwardly from the uppermost plate of the column, the proportion of water to propylene chloride very markedly decreases until at the lower plates of the column, nothing but propylene chloride and acetic acid exist upon each plate. As we proceed downwardly through the lower plates of the column, we will find that the ratio of propylene chloride to acetic acid decreases until at the lowermost plate of the column it will be found that substantially pure acetic acid exists. It will, therefore, be observed that this lower portion of the column 1 is made to perform the same function as the additional or supplemental column required in most processes of this general type. This substantially pure acetic acid refluxes into the still pot 2 where the excess accumulating is drawn off through the pipe 4 and conducted to storage or such use as may be intended.

If instead of introducing the aqueous acetic acid in liquid form by means of the pipe 5 it be desired to employ the supplemental still pot 19 we may assume that the pipe line 5 is entirely shut off and the aqueous acetic acid is conducted directly to the still pot 19. In this still pot 19 the aqueous acetic acid is vaporized and the mixed vapors of water and acetic acid are conducted by means of the pipe 18 into the column 1 at a point approximately one-third the way up the column. These acetic acid and water vapors then travel up the column and meet the downwardly progressing stream or supply of propylene chloride. The water combining with the propylene chloride forms, of course, a constant boiling mixture which distills off and passes in a vaporous state to the next higher plate and so on up the column; the acetic acid not vaporizing, of course, passes down the column so that the cycle occurring when the supplemental still pot 19 is utilized is the same in principle as when the aqueous acetic acid is introduced into the column through the pipe 5 in liquid form, the difference being merely in the detail that the composition of the mixture upon each plate will vary slightly due to the fact that the water in liquid or vapor form, respectively, is introduced at a different position in the column. The pipe 18 may of course, be provided with a suitable check valve in the event it may be desired to change from one mode of operation to the other at different times. As will be understood by those skilled in the art, the exact point in the column at which the liquid or vaporous aqueous acetic acid is introduced is best determined by practice. Suffice it to say, the attempt should be made to introduce the material to be dehydrated at a point where the composition of the mixture in the column has substantially the same water content as that being introduced.

It is also possible to simultaneously introduce the aqueous acetic acid in vapor form through the line 18 and in liquid form through the line 5 and operate the process in that manner. In any event in operating this process by any of the methods indicated it is necessary merely that the operator control the input of the various materials into the column in such a way that substantially pure concentrated acetic acid issues from the bottom of the column and that a constant boiling mixture of propylene chloride and water exists upon the top plate of the column.

Fig. 2 shows diagrammatically a somewhat different forms of apparatus for carrying out my invention which employs a plurality of shorter distillation columns in place of the single high column of Fig. 1. The supply tank of aqueous acetic acid 38 is connected by pipe 39, controlled by valve 40 with an intermediate portion (say about two-thirds of the way up) of a fractionating column 41 of one of the usual types, though not necessarily forty plates high. At the top of this column a downward current or spray of propylene chloride enters from nozzle or opening 42, which is connected with the horizontal transverse pipe 43. The base of the column is provided with the customary heating vessel 44, the heating fluid for which comes through pipes 45. The azeotropic mixture of the vapors of water and propylene chloride leaves the top of the column passing around pipe 43 into pipe 46 and from thence enters condenser 47, the cooling fluid of which circulates through pipes 48. The distillate from 47 flows down into settling chamber 49, the latter being provided with a downwardly extending transverse partition 50, which is separated, however, from the bottom of the vessel. The pipe 51 from the condenser 47 likewise extends well down into the vessel 49. When the distillate reaches vessel 49, it separates into two layers, the water layer being uppermost and confined at one side of the partition 50, as shown in the drawings. From the vessel 49 the watery layer passes through exit pipe 52 to further treating apparatus which will be described hereinafter. The lower layer of propylene chloride passes beneath the partition 50 and out through pipe 53 to pipe 43 and thence downwardly through the nozzle 42 into the fractionating column 41. Thus the bulk of the propylene chloride passes through a cycle from nozzle 42 to column 41 and thence through the following parts,—46, 47, 51, 49, 53 and 43.

There is, of course, an excess of propylene chloride maintained at the various distillation points in the system, as previously described, namely, more than about 7⅓ parts by weight of propylene chloride for each part by weight of water to be eliminated. This means that some propylene chloride will collect with the dehydrated or glacial acetic acid in the heating vessel 44 unless a high and well regulated column is employed as in Fig. 1. This dehydrated mixture is then conducted through pipe 54 controlled by valve 55' to an intermediate portion of an auxiliary fractionating column 55 of one of the known types. The heating of this column 55 is done in the chamber 56, the heating fluid for which circulates through pipes 57. Vapors of propylene chloride pass from the top of the column through pipe 58 to condenser 59, the cooling fluid of which circulates through pipes 60. This condensed propylene chloride can be passed partly through pipe 61 controlled by valve 62 into pipe 43 and nozzle 42 of the main fractionating column, and partly through pipe 63 controlled by valve 64 into the nozzle or opening 65 at the top of column 55, there to act as refluxing liquid.

The glacial acetic acid in vessel 56 is conducted through pipe 66 to a simple still 67, the heating fluid for which circulates through pipes 68. The vapors of acetic acid pass over through pipe 69 into the final condenser 70 from which the glacial acetic acid can be drawn off and stored. The distillation in still 67 is not indispensable, but is preferable to remove some small amounts of coloring or polymerized bodies that may be formed during the other operations.

Referring to the upper left-hand part of Fig. 2, the watery layer from the settling vessel 49 passes through pipe 52 to the nozzle or opening 71 at the top of fractionating column 72, the latter being of any of the usual types. Steam is blown into the column through pipe 73 and hot water passes waste through pipe 70', preferably to a heat interchanger, not shown. The passage of the steam up the column 72 flashes off the small amount of propylene chloride which is present in the watery material descending from nozzle 71. The vapors of propylene chloride and water pass through pipe 74 into condenser 75, the cooling fluid of which circulates through pipes 76. The propylene chloride from 75 passes through pipe 51 to the bottom or lower layer of the settling vessel 49 and thence returns through the normal circulator path of the propylene chloride through pipes 53 and 43 and nozzle 42.

From the foregoing it will be apparent that my invention may be carried out in many forms of apparatus, of which Figs. 1 and 2 are illustrative. In fact, the invention may be carried out with an ordinary balloon distillation flask and a condenser as a batch operation although that would not be very economical on a commercial scale and does not result in the most efficient dehydration of the acetic acid. Other forms of apparatus and methods of carrying out the invention may be employed without departing from the spirit and scope thereof.

It will be also understood that in all forms of apparatus the customary precautions for preventing heat losses by suitable insulation are observed, and the parts which contact with the acid are made of resistant materials customarily employed for that purpose. Furthermore, the process is preferably operated under atmospheric pressure conditions, although it can be conducted with the system at superatmospheric pressure or subatmospheric. When I refer herein to the boiling points of the ingredients and mixtures such, for instance, as the boiling point of water, I refer to those under the particular pressure conditions that are employed, normally atmospheric.

What I claim as my invention and desire to secure by Letters Patent of the United States is:

1. In the process of dehydrating aqueous acetic acid the step of mixing propylene chloride with the aqueous acetic acid and distilling water and propylene chloride from the mixture.

2. In the process of dehydrating aqueous acetic acid, the step of supplying aqueous acetic acid to a distilling column, during distillation therein adding propylene chloride at the upper part of the column and removing from the top of the column a constant boiling mixture of water and propylene chloride.

3. In the process of dehydrating aqueous acetic acid, the step of mixing propylene chloride with the aqueous acetic acid, distilling water and propylene chloride from the mixture, condensing the distillate, allowing it to settle into two layers, and returning the lower layer to the original mixture undergoing distillation.

4. In the process of dehydrating aqueous acetic acid, the step of mixing propylene chloride with the aqueous acetic acid, distilling water and propylene chloride from the mixture, condensing the distillate, allowing it to settle into two layers, returning the lower layer to the original mixture undergoing distillation, and separating the dehydrated acetic acid from the remaining propylene chloride.

5. In the process of dehydrating aqueous acetic acid, the step of supplying aqueous acetic acid to a distilling column having fractionating plates therein, during distillation therein adding propylene chloride to the upper plate of the column in an amount in excess of that necessary to form with the water present a constant boiling mixture of water and propylene chloride and removing from the top of the column in vaporous form a constant boiling mixture of water and propylene chloride.

6. In the process of removing water from aqueous acetic acid the steps of mixing therewith propylene chloride and distilling water and propylene chloride from the mixture at a temperature below the boiling point of water.

7. In the process of removing water from aqueous acetic acid the steps of mixing therewith at least seven and one-third parts by weight of propylene chloride for each part of water to be removed, and distilling water and propylene chloride from said mixture.

8. The continuous process of removing water from dilute acetic acid which comprises charging a still with a mixture of dilute acetic acid and propylene chloride, distilling water and said propylene chloride from said mixture, condensing the distillate, substantially separating said propylene chloride from the water, returning the separated propylene chloride substantially continuously to the still, and supplying dilute acetic acid substantially continuously to the still.

Signed at Rochester, N. Y., this 12th day of March, 1931.

WILLIAM W. HARTMAN.